United States Patent
Bydalek

(12) 
(10) Patent No.: US 6,435,791 B1
(45) Date of Patent: Aug. 20, 2002

(54) WHEEL FASTENER ASSEMBLIES

(75) Inventor: Theodore J. Bydalek, Buffalo Grove, IL (US)

(73) Assignee: MacLean-Fogg Company, Wheeling, IL (US)

( * ) Notice: Subject to any disclaimer, the term of this patent is extended or adjusted under 35 U.S.C. 154(b) by 0 days.

(21) Appl. No.: 09/574,905

(22) Filed: May 19, 2000

(51) Int. Cl.⁷ ................. F16B 37/00; F16B 43/00
(52) U.S. Cl. ............ 411/428; 411/371.2; 411/432; 411/533; 411/534
(58) Field of Search ................. 411/402, 428, 411/429, 432, 533, 534, 371.2, 372

(56) References Cited

U.S. PATENT DOCUMENTS

| | | | |
|---|---|---|---|
| 3,584,667 A | * | 6/1971 | Reiland ............ 411/402 X |
| 3,659,491 A | | 5/1972 | Duffy et al. |
| 4,103,725 A | | 8/1978 | Abe |
| 4,362,449 A | | 12/1982 | Hinsky |
| 4,790,703 A | | 12/1988 | Wing |
| 4,898,429 A | | 2/1990 | Plumer |
| 4,969,788 A | | 11/1990 | Goiny |
| 4,984,938 A | * | 1/1991 | Scott, Jr. et al. ........ 411/428 X |
| 4,986,712 A | | 1/1991 | Fultz |
| 5,180,266 A | * | 1/1993 | Nolan et al. ............ 411/429 |
| 5,584,628 A | * | 12/1996 | Bernoni ............ 411/533 X |
| 5,688,091 A | | 11/1997 | McKinlay |
| 5,730,568 A | | 3/1998 | Lanham et al. |
| 5,772,377 A | | 6/1998 | Bydalek |

FOREIGN PATENT DOCUMENTS

WO    WO 94/07041    3/1994

* cited by examiner

*Primary Examiner*—Neill Wilson
(74) *Attorney, Agent, or Firm*—Brinks Hofer Gilson & Lione; Gregory H. Zayia

(57) ABSTRACT

A fastener assembly includes (a) a fastening member that includes an out-of-round portion centered about a longitudinal axis and configured for engagement with a torque-transmitting tool, a frustoconical load-bearing surface that extends radially outwardly from the longitudinal axis, and a threaded portion that is centered about the longitudinal axis; (b) a metallic, frustoconical thrust washer having a concave surface positioned adjacent to the load-bearing surface of the fastening member, and a convex surface; and (c) a pressure ring that includes a flange, a frustoconical load-bearing surface formed by the flange and positioned adjacent to the convex surface of the thrust washer, and a frustoconical undersurface oriented to contact a complementary depression in a workpiece.

43 Claims, 4 Drawing Sheets

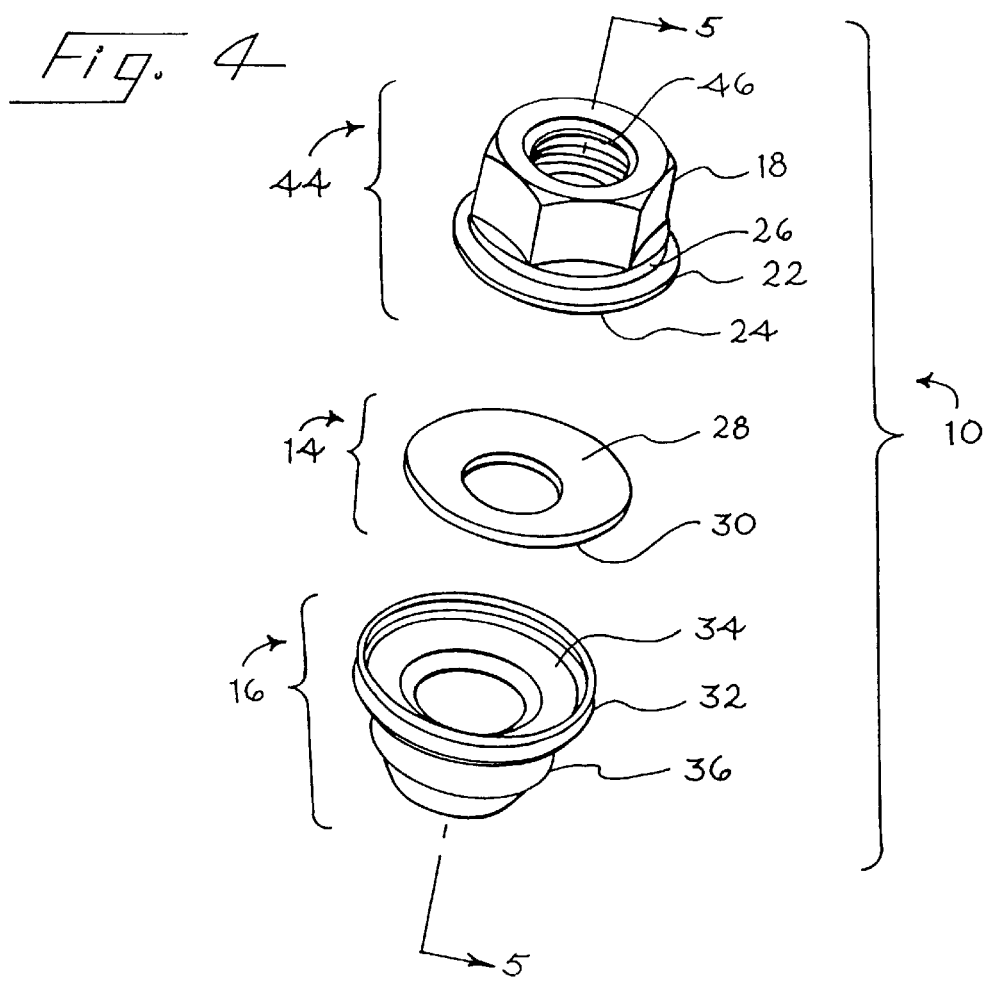
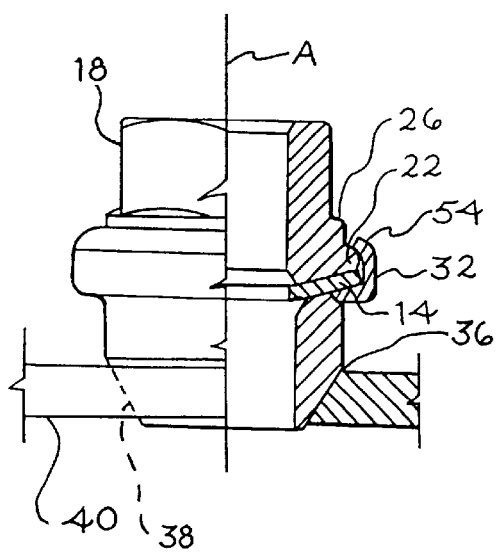
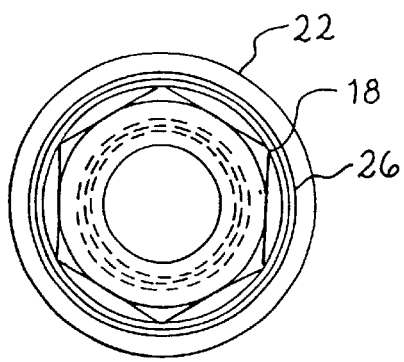

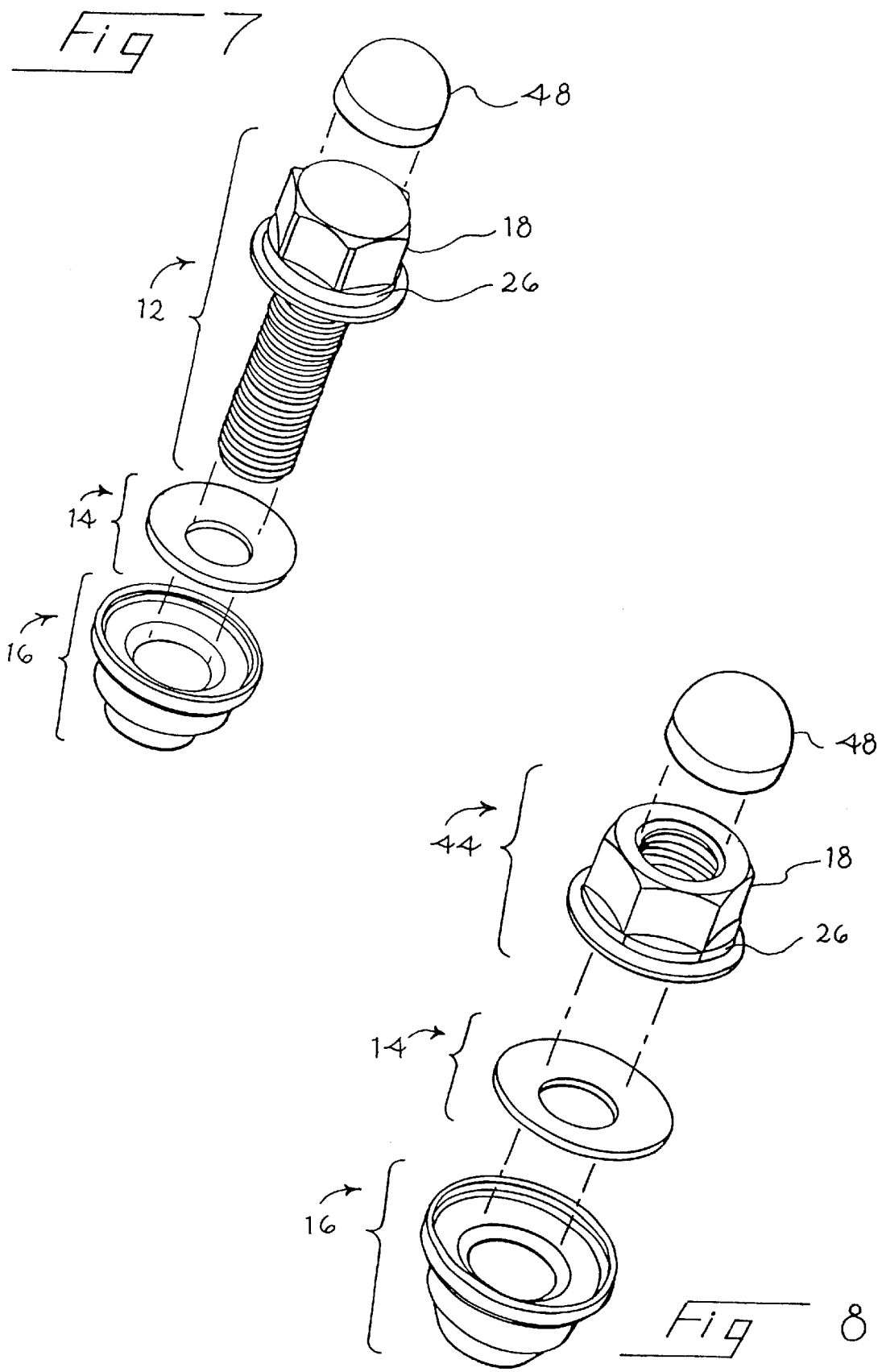

WHEEL FASTENER ASSEMBLIES

BACKGROUND

This invention relates to fastener assemblies, and particularly to fastener assemblies for mounting wheels.

Two-piece wheel fastener assemblies consisting of a nut/bolt and a pressure ring have previously been employed for fastening wheels. For example, a two-piece nut with pressure ring assembly is described in Goiny U.S. Pat. No. 4,969,788. Drawbacks inherent in such two-piece designs include inconsistent torque tensions, and rotation of the conical pressure ring within the wheel surface wherein it is seated (cf., Col. 4, II. 9–12 of Goiny patent). Rotation of this pressure ring, combined with the softness of wheel materials and high compressive stresses, can result in galling or welding of the nut/bolt to the wheel.

Hlinsky U.S. Pat. No. 4,362,449 discloses a wheel fastener with a fastener body, a pressure washer rotatably mounted on the fastener body, and a plastic washer therebetween. This plastic washer has the disadvantage of a low hardness that allows the plastic washer to deform plastically when the fastener is tightened in place. Such plastic deformation can result in a relaxation of the clamping force applied by the tightened fastener, which is undesirable in most applications.

The present invention is directed to overcoming these and other disadvantages inherent in prior-art systems.

SUMMARY

The scope of the present invention is defined solely by the appended claims, and is not affected to any degree by the statements within this summary.

Briefly stated, a wheel fastener assembly embodying features of the present invention comprises a fastening member, a frustoconical metal thrust washer, and a pressure ring having an undersurface which is oriented to contact a depression in a workpiece.

BRIEF DESCRIPTION OF THE DRAWINGS

FIG. 4 is an exploded perspective view of a second preferred embodiment of this invention.

FIG. 5 is a cross-sectional view taken along line 5—5 of FIG. 4.

FIG. 6 is a top view of the second preferred embodiment depicted in FIGS. 4 and 5.

FIG. 7 is an exploded perspective view of a third preferred embodiment of this invention.

FIG. 8 is an exploded perspective view of a fourth preferred embodiment of this invention.

DETAILED DESCRIPTION OF THE PRESENTLY PREFERRED EMBODIMENTS

Figure 1:
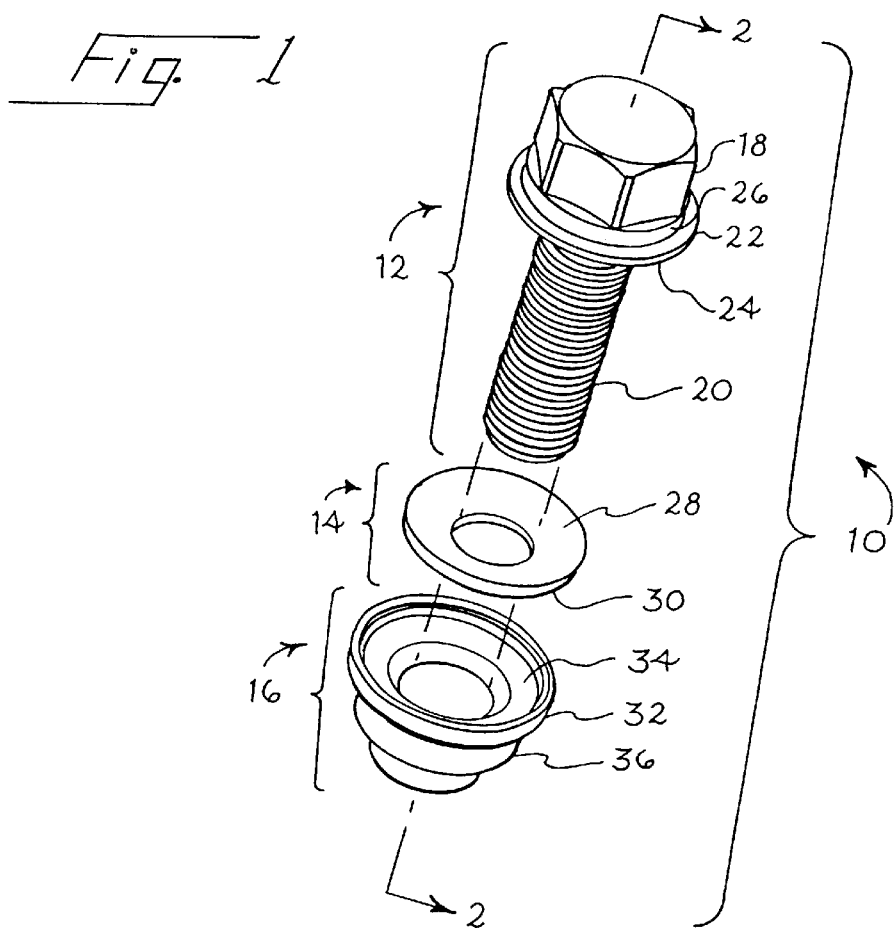
FIG. 1 is an exploded perspective view of a first preferred embodiment of this invention.
Figure 2:
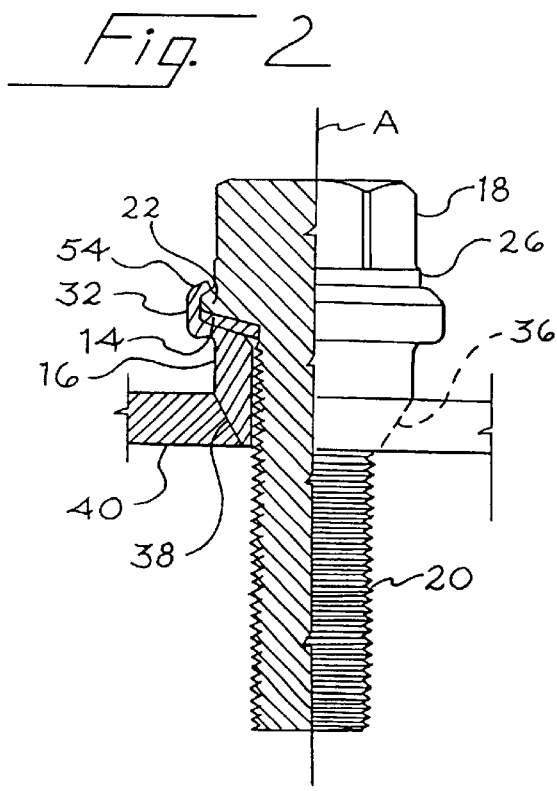
FIG. 2 is a cross-sectional view taken along line 2—2 of FIG. 1.
Figure 3:
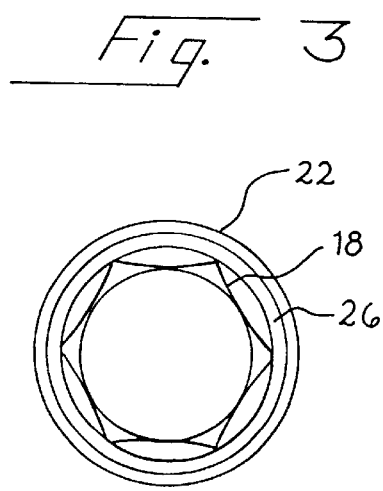
FIG. 3 is a top view of the first preferred embodiment depicted in FIGS. 1 and 2.

Turning now to the drawings, FIGS. 1, 2 and 3 show a wheel fastener assembly 10 constituting a first preferred embodiment of the present invention, and comprising a fastening member 8, a thrust washer 14, and a pressure ring 16.

In this first preferred embodiment, best shown in FIGS. 1 and 2, the fastening member 8 is a bolt 12 comprising an out-of-round portion 18 and a male threaded portion 20, each of which is centered about a longitudinal axis A. The bolt further comprises a flange 22, which extends radially outwardly from the out-of-round portion 18, and comprises on its underside a load-bearing surface 24. The load-bearing surface 24 is angled by a desired cone angle α. In this embodiment, the out-of-round portion 18 is hexagonal, and defines a set of six wrench flats configured for accepting torque from an installation tool such as a wrench (not shown). The bolt 12 further comprises a surface for supporting the lower peripheral edge of the aforementioned installation tool, such that contact between this tool and the pressure ring 16 is prevented. During installation, such contact could transfer torque between the tool and the pressure ring 16, thereby creating drag and leading to inconsistent clamping forces against the wheel. In this first preferred embodiment, this surface for supporting is defined by an annular ring 26 that extends radially outwardly from the out-of-round portion 18.

The thrust washer 14 is frustoconically-shaped (i.e., shaped like a frustum of a right circular cone), and is interposed between the bolt 12 and the pressure ring 16. Interposition of the thrust washer 14 between the bolt 12 and the pressure ring 16 controls friction between these elements, and often prevents rotation of the pressure ring 16 in the wheel surface 40. The thrust washer 14 comprises a concave surface 28 and an opposing convex surface 30. The concave surface 28 has a substantially identical cone angle to the load-bearing surface 24, with which it is in surface contact. Throughout this description and in the appended claims, contacting surfaces having substantially identical cone angles will be referred to as being complementary surfaces.

The thrust washer 14 can be coated with a lubricous coating such as a fluorocarbon (e.g., polytetrafluoroethylene PTFE) or a similar finish to reduce the friction between the bolt 12 and the pressure ring 16, and to control the amount of tension generated in the bolt 12 by the application of a given torque. The thrust washer 14 can be made from a heat treatable grade of steel to minimize galling between the bolt 12 and the pressure ring 16.

The pressure ring 16 comprises a flange 32 and a load-bearing surface 34. This load-bearing surface 34 is complementary to and in surface contact with the convex surface 30 of the thrust washer 14. In this embodiment, the flange 32 further comprises a crimp 54 that overlaps the flange 22 of the bolt 12, thus preventing the inadvertent separation of the bolt 12 from the pressure ring 16 while preserving a degree of longitudinal and transversal play of these elements with respect to the longitudinal axis A. The pressure ring 16 further comprises a frustoconical undersurface 36, which is positioned in a complementary depression 38 in the wheel surface 40. The pressure ring 16 can be finished with any desired coating to provide a decorative appearance and/or protection from corrosion, as is known in the art.

The complementary bearing surfaces of the bolt 12, the frustoconical thrust washer 14, and the pressure ring 16 are best shown in FIG. 2. The angling of these surfaces results in several significant advantages including but not limited to: increasing the contact area of these components, thereby decreasing the associated bearing compression stresses;

enabling foreign substances trapped between mating surfaces to be squeezed out during installation; and facilitating proper alignment of the fastening member 8 during assembly with the wheel, thus preventing the premature breakage of wheel studs which can result from misalignment. The frustoconical surfaces of the bolt 12, the thrust washer 14 and the pressure ring 16 provide a centering force that centers the pressure ring 16 on the longitudinal axis A, and the frustoconical undersurface 36 provides a centering force that centers the wheel surface 40 on the longitudinal axis A when the fastener assembly is tightened.

FIGS. 4, 5, and 6 show a second fastener assembly embodying features of the present invention. This second preferred embodiment is substantially similar to the above-described first preferred embodiment, except that the fastening member 8 is depicted as a nut 44 rather than a bolt 12, and comprises a female thread 46 rather than a male thread 20. Elements of this second preferred embodiment—and of other embodiments to be described hereinbelow—which are otherwise identical to those of the above-described first preferred embodiment are identified in the drawings and in the associated description using the same reference numerals as those of FIGS. 1, 2, and 3.

FIG. 7 shows a third preferred embodiment of the present invention wherein the fastening member 8 is a bolt 12, and the out-of-round portion 18 comprises a decorative cap or button 48.

FIG. 8 shows a fourth preferred embodiment of the present invention wherein the fastening member 8 is a nut 44, and the out-of-round portion 18 comprises a decorative cap or button 48.

Figure 9:
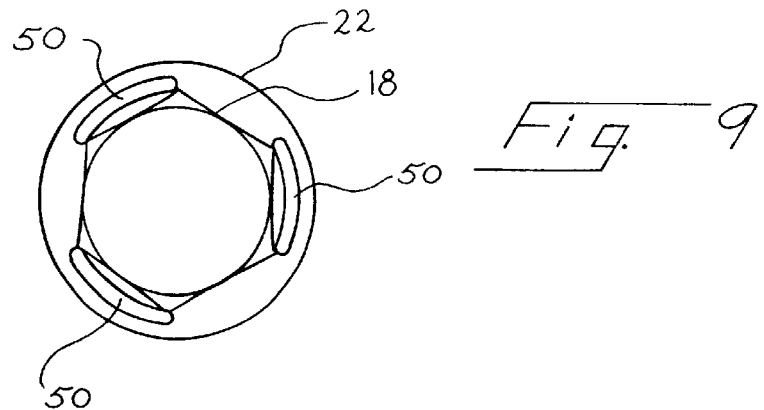
FIG. 9 is a top view of a fifth preferred embodiment of this invention.
Figure 10:
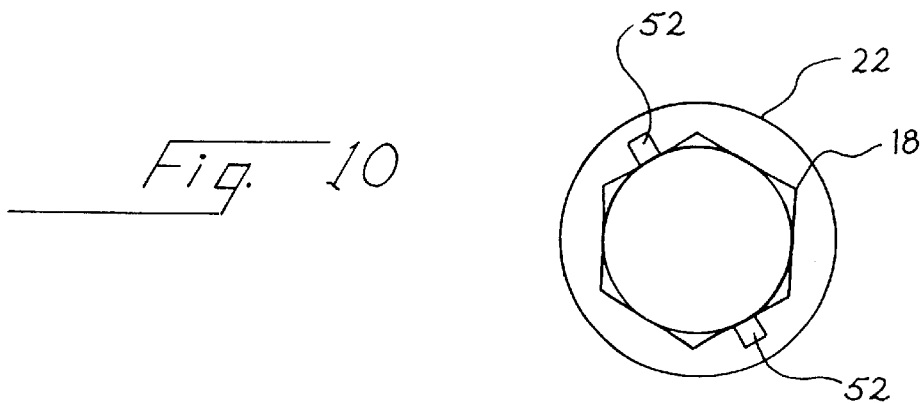
FIG. 10 is a top view of a sixth preferred embodiment of this invention.

In all of the embodiments described above, the surface for supporting the lower peripheral edge of the installation tool to prevent its contact with the pressure ring 16 has been defined by an annular ring 26. However, alternative means for supporting this lower peripheral edge can be used in place of the annular ring 26, and are within the scope of this invention. Examples include but are not limited to: a surface defined by a penannular ring 50 that extends radially outwardly from the out-of-round portion 18 (FIG. 9); a surface defined by at least one stanchion 52 that extends radially outwardly from the out-of-round portion 18 (FIG. 10); a surface defined by at least one pair of stanchions 52, each of which stanchions extends radially outwardly from the out-of-round portion 18 (FIG. 10); and a surface defined by at least one pair of stanchions 52 arranged directly across from one another on opposite sides of the longitudinal axis A, each of which stanchions extends radially outwardly from the out-of-round portion 18 (FIG. 10).

Figure 11:
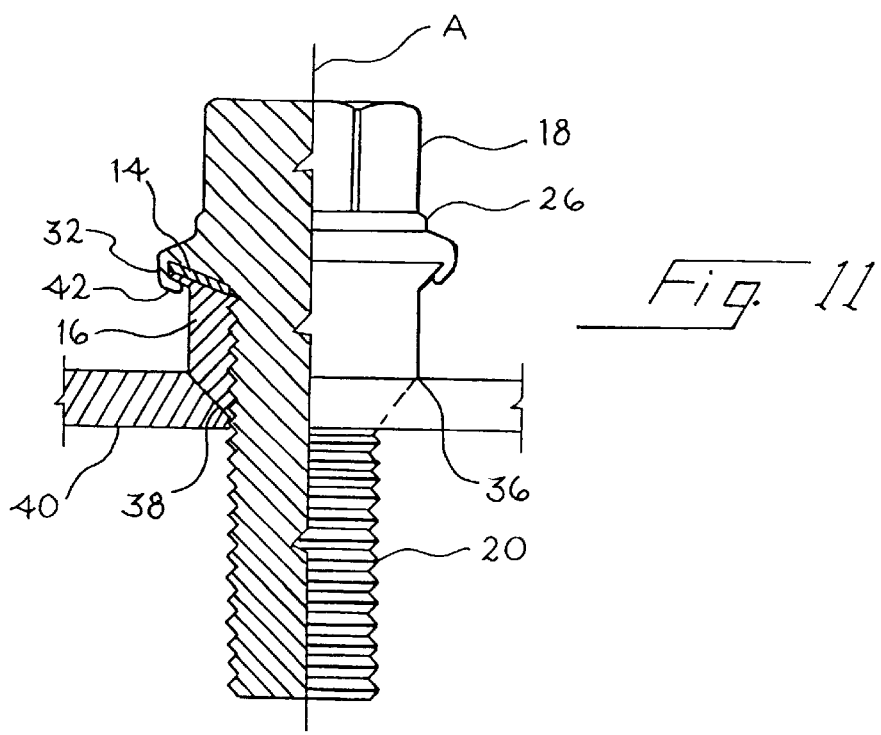
FIG. 11 is a cross-sectional view of a seventh preferred embodiment of this invention.

In all of the embodiments described above, the flange 32 of the pressure ring 16 is crimped over the flange 22 of the fastening member 8 to prevent the inadvertent separation of the two elements. However, alternative means for coupling the fastening member 8 and the pressure ring 16 can be used in place of the crimp 54 on the flange 32, and are within the scope of this invention. Examples include but are not limited to the following: the flange 22 of the fastening member 8 may comprise a crimp 42 that overlaps the flange 32 of the pressure ring 16 (FIG. 11), an arrangement which is the reverse to that described above; and either the flange 22 or the flange 32 may comprise one or more tabs (i.e., small segments of the full crimps 42 or 54) that overlap the flange lacking such tabs (not shown).

The thrust washer 14 is preferably formed from a metal that does not flow under the pressures that are applied to the thrust washer 14 when the fastener assembly is tightened in place. Such flow is disadvantageous, because it reduces the clamping force that the fastener assembly applies to the workpiece. The metal used to form the thrust washer 14 preferably has a hardness that is greater than 80 as measured on the Rockwell B scale and more preferably has a hardness that is greater than 40 on the Rockwell C scale.

The components of wheel fastener assemblies embodying features of the present invention can be manufactured from a wide variety of materials. By way of example and not of limitation, the fastening member 8 (e.g., bolt 12, nut 44), the thrust washer 14, and the pressure ring 16 can be manufactured from a low-, medium-, or high-carbon steel, which can be either heat-treated or not depending on the desired material strength requirements for a given application. In addition, the fastening member 8, the thrust washer 14, and the pressure ring 16—either singly or in any combination—may be coated with a wide variety of finishes (e.g., corrosion inhibitors, lubricous coatings such as PTFE, paints/varnishes, etc.), and/or electroplated with metals such as Zn, Cd, Ni and Cr. Preferably, the fastening member 8 (e.g., bolt 12, nut 44), the thrust washer 14, and the pressure ring 16 are manufactured from a medium-carbon, heat-treated steel, and the frustoconical thrust washer 14 is coated with PTFE.

Numerous variations that lie within the scope of the appended claims and their equivalents can be made to the presently preferred embodiments described hereinabove. Examples include but are not limited to the following (not shown). The frustoconical bearing surfaces of the fastening member 8, the thrust washer 14, and the pressure ring 16 can be non-complementary (i.e., can be defined by non-equivalent cone angles). The pressure ring 16 can comprise a non-frustoconical undersurface such as a cylindrical undersurface 56 (i.e., one that does not taper from top to bottom like the frustoconical undersurface 36), a hemispherical undersurface 58, or a catenoidal undersurface 60 (i.e., an undersurface shaped like a catenoid). A flat thrust washer 62 having first and second opposed flat bearing surfaces (64 and 66, respectively) can be used in place of the frustoconical thrust washer 14. The fastening member 8 and the pressure ring 16 can comprise flat load-bearing surfaces (68 and 70, respectively)—either in combination with or independently of the flat thrust washer 62.

The foregoing detailed description has been provided by way of explanation and illustration, and is not intended to limit the scope of the appended claims. Many variations in the presently preferred embodiments illustrated herein will be obvious to one of ordinary skill in the art, and remain within the scope of the appended claims and their equivalents.

I claim:

1. A wheel fastener assembly comprising:
   (a) a fastening member comprising:
      an out-of-round portion centered about a longitudinal axis, said out-of-round portion being configured for engagement with a torque-transmitting tool;
      a load-bearing surface extending radially outwardly from said longitudinal axis;
      a flange;
      a threaded portion centered about said longitudinal axis; and
      a surface for supporting a lower periphery of said tool when said tool is fully engaged with said out-of-round portion, said surface for supporting extending radially outwardly from said out-of-round portion, such that said surface for supporting prevents said tool from contacting said flange of said fastening member;

(b) a metallic thrust washer comprising:
   a first load-bearing surface positioned adjacent to said load-bearing surface of said fastening member; and
   a second load-bearing surface; and
(c) a pressure ring comprising:
   a load-bearing surface positioned adjacent to said second load-bearing surface of said thrust washer; and
   an undersurface oriented to contact a workpiece.

2. The invention of claim 1, wherein said surface for supporting further prevents said tool from contacting said pressure ring.

3. The invention of claim 2, wherein said surface for supporting further prevents said tool from contacting said workpiece.

4. The invention of claim 1, wherein said load-bearing surface of said fastening member and said out-of-round portion are separated by said flange.

5. The invention of claim 1, wherein said pressure ring further comprises a flange.

6. A wheel fastener assembly comprising:
(a) a fastening member comprising:
   an out-of-round portion centered about a longitudinal axis, said out-of-round portion being configured for engagement with a torque-transmitting tool;
   a load-bearing surface extending radially outwardly from said longitudinal axis; and
   a threaded portion centered about said longitudinal axis;
(b) a metallic thrust washer comprising:
   a first load-bearing surface positioned adjacent to said load-bearing surface of said fastening member; and
   a second load-bearing surface; and
(c) a pressure ring comprising:
   a load-bearing surface positioned adjacent to said second load-bearing surface of said thrust washer; and
   an undersurface oriented to contact a workpiece, wherein said undersurface of said pressure ring comprises a frustoconical portion.

7. The invention of claim 6, wherein said thrust washer is frustoconical, such that said first load-bearing surface defines a concave surface, and said second load-bearing surface defines a convex surface.

8. The invention of claim 6, wherein:
   said load-bearing surface of said fastening member is frustoconical;
   said load-bearing surface of said pressure ring is frustoconical; and
   said first and second load-bearing surfaces of said thrust washer are frustoconical.

9. The invention of claim 8, wherein:
   said load-bearing surface of said fastening member is complementary to said first load-bearing surface of said thrust washer; and
   said load-bearing surface of said pressure ring is complementary to said second load-bearing surface of said thrust washer.

10. The invention of claim 6, wherein said thrust washer further comprises a lubricous coating.

11. The invention of claim 10, wherein said lubricous coating comprises polytetrafluoroethylene.

12. The invention of claim 6, wherein said threaded portion comprises a male thread.

13. The invention of claim 6, wherein said threaded portion comprises a female thread.

14. The invention of claim 6, wherein said fastening member comprises a nut.

15. The invention of claim 6, wherein said fastening member comprises a bolt.

16. The invention of claim 6, wherein said pressure ring further comprises a coating selected from the group consisting of a decorative finish, a corrosion-inhibiting finish, and a combination thereof.

17. The invention of claim 6, further comprising:
   means for coupling said fastening member and said pressure ring so as to inhibit their separation.

18. The invention of claim 17, wherein said coupling means allows longitudinal and transverse shifting of said fastening member and said pressure ring with respect to said longitudinal axis.

19. The invention of claim 6, wherein said pressure ring comprises a flange, and wherein said fastening member comprises a crimp overlapping said flange of said pressure ring.

20. The invention of claim 6, wherein said fastening member comprises a flange, and wherein said pressure ring comprises a crimp overlapping said flange of said fastening member.

21. The invention of claim 6 wherein said pressure ring further comprises a flange.

22. A wheel fastener assembly comprising:
(a) a fastening member comprising:
   an out-of-round portion centered about a longitudinal axis, said out-of-round portion being configured for engagement with a torque-transmitting tool;
   a load-bearing surface extending radially outwardly from said longitudinal axis;
   a threaded portion centered about said longitudinal axis; and
   a decorative cap;
(b) a metallic thrust washer comprising:
   a first load-bearing surface positioned adjacent to said load-bearing surface of said fastening member; and
   a second load-bearing surface; and
(c) a pressure ring comprising:
   a load-bearing surface positioned adjacent to said second load-bearing surface of said thrust washer; and
   an undersurface oriented to contact a workpiece.

23. The invention of claim 22, wherein said decorative cap is positioned atop said out-of-round portion.

24. A wheel fastening member comprising:
   an out-of-round portion configured for receiving torque from a tool, said tool having a lower periphery configured for bearing upon at least one surface of said out-of-round portion;
   a flange extending radially outwardly from said out-of-round portion; and
   a surface for supporting said lower periphery of said tool when said tool is fully engaged with said out-of-round portion, said surface for supporting extending radially outwardly from said out-of-round portion, such that said surface for supporting prevents said tool from contacting said flange, wherein said surface for supporting is selected from the group consisting of a surface defined by an annular ring, a surface defined by a penannular ring, a surface defined by a stanchion, and a surface defined by a pair of stanchions.

25. A wheel fastening member comprising:
an out-of-round portion configured for receiving torque from a tool, said tool having a lower periphery configured for bearing upon at least one surface of said out-of-round portion;
a flange extending radially outwardly from said out-of-round portion; and
a surface for supporting said lower periphery of said tool when said tool is fully engaged with said out-of-round portion, said surface for supporting extending radially outwardly from said out-of-round portion, such that said surface for supporting prevents said tool from contacting said flange;
in combination with a rotatable pressure ring extending above said flange of said wheel fastening member, such that said surface for supporting prevents said tool from contacting said pressure ring.

26. The invention of claim 24, wherein said surface for supporting is defined by said annular ring, and wherein said out-of-round portion comprises said annular ring.

27. The invention of claim 24, wherein said surface for supporting is defined by said penannular ring, and wherein said out-of-round portion comprises said penannular ring.

28. The invention of claim 24, wherein said surface for supporting is defined by said stanchion, and wherein said out-of-round portion comprises at least one of said stanchions.

29. The invention of claim 24, wherein said pair of stanchions defines said surface for supporting.

30. The invention of claim 29, wherein the stanchions of said at least one pair of stanchions are arranged directly across from one another on opposite sides of a longitudinal axis of said fastening member.

31. A wheel fastening member comprising:
an out-of-round portion configured for receiving torque from a tool, said tool having a lower periphery configured for bearing upon at least one surface of said out-of-round portion;
a flange extending radially outwardly from said out-of-round portion; and
means for supporting said lower periphery of said tool when said tool is fully engaged with said out-of-round portion, said supporting means extending radially outwardly from said out-of-round portion, such that said supporting means prevents said tool from contacting said flange;
in combination with a rotatable pressure ring extending above said flange of said wheel fastening member, such that said supporting means prevents said tool from contacting said pressure ring.

32. The invention of claim 24, 25, or 31, wherein said fastening member comprises a nut.

33. The invention of claim 24, 25, or 31, wherein said fastening member comprises a bolt.

34. A wheel fastener assembly comprising:
(a) a fastening member comprising:
an out-of-round portion centered about a longitudinal axis, said out-of-round portion being configured for engagement with a torque-transmitting tool;
a flange extending radially outwardly from said out-of-round portion;
a frustoconical load-bearing surface, said load-bearing surface being separated from said out-of-round portion by said flange; and
a threaded portion centered about said longitudinal axis;
(b) a frustoconical, metallic thrust washer comprising a concave surface and an opposing convex surface, said concave surface positioned adjacent to said load-bearing surface of said fastening member; and
(c) a pressure ring comprising:
a flange;
a frustoconical load-bearing surface formed by said flange, said load-bearing surface being positioned adjacent to said convex surface of said thrust washer; and
a frustoconical undersurface oriented to contact a complementary depression in a workpiece.

35. The invention of claim 34, wherein said fastening member comprises a nut.

36. The invention of claim 34, wherein said fastening member comprises a bolt.

37. The invention of claim 34, 35, or 36, wherein said fastening member further comprises a crimp overlapping said flange of said pressure ring.

38. The invention of claim 37, wherein said out-of-round portion comprises a surface for supporting and preventing said tool from contacting said pressure ring when said tool is fully engaged with said out-of-round portion.

39. The invention of claim 34, 35, or 36, wherein said pressure ring further comprises a crimp overlapping said flange of said fastening member.

40. The invention of claim 39, wherein said out-of-round portion comprises a surface for supporting, and preventing said tool from contacting said pressure ring when said tool is fully engaged with said out-of-round portion.

41. The invention of claim 34, wherein each of said fastening member, said frustoconical thrust washer, and said pressure ring is independently comprised of a material selected from the group consisting of medium-carbon heat-treated steel, high-carbon heat-treated steel, low-carbon steel, medium-carbon steel, and high-carbon steel.

42. The invention of claim 34, wherein each of said fastening member, said frustoconical thrust washer, and said pressure ring is comprised of a medium-carbon, heat-treated steel.

43. The invention of claim 42, wherein said frustoconical thrust washer comprises a lubricious coating.

\* \* \* \* \*